(No Model.)
C. SELDEN.
RAILROAD BRAKE.
No. 361,090. Patented Apr. 12, 1887.
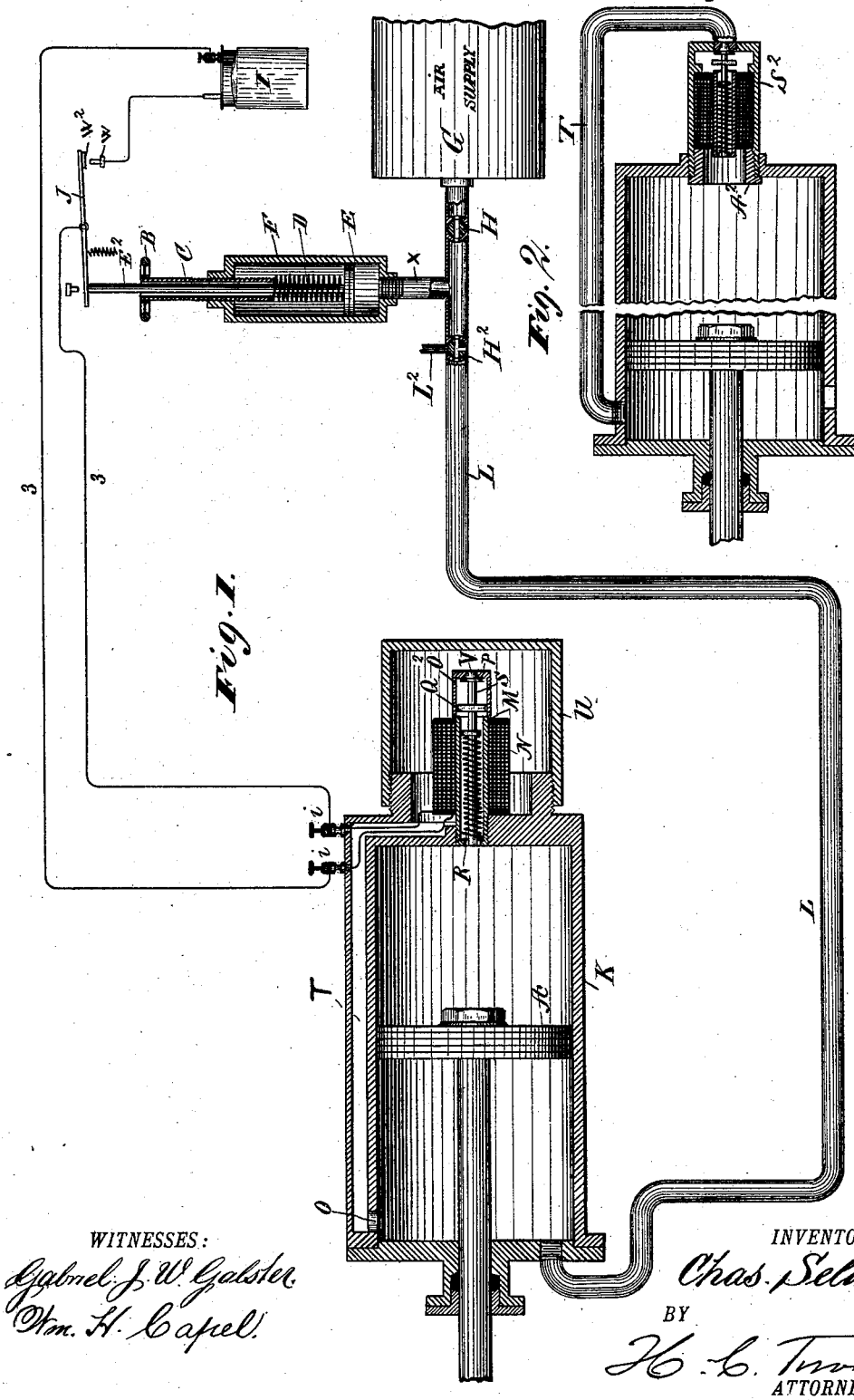
WITNESSES:
INVENTOR
Chas. Selden.
BY
H. C. Townsend
ATTORNEY

UNITED STATES PATENT OFFICE.

CHARLES SELDEN, OF BALTIMORE, MARYLAND.

RAILROAD-BRAKE.

SPECIFICATION forming part of Letters Patent No. 361,090, dated April 12, 1887.

Application filed March 29, 1886. Serial No. 196,947. (No model.)

*To all whom it may concern:*

Be it known that I, CHARLES SELDEN, a citizen of the United States, and a resident of Baltimore, in the State of Maryland, have invented certain new and useful Railway-Brakes, of which the following is a specification.

My invention relates to means for controlling the action of brakes that are operated by the pressure of air, steam, or other fluid.

The invention is designed more especially for application to railway-brakes in which air-pressure is employed for operating a piston mechanically connected with the brakes.

The object of the invention is to provide a means whereby the necessity of placing the entire power of the compressed air at one time upon the wheels may be avoided, and whereby the engineer may have a control of the pressure and apply the brakes gradually by reason of the control which he has over the action of the magnet-controlling valve, by which means he may determine just how much difference there shall be in pressure in the two portions of the cylinder, so that on a level grade he may use little pressure, and thus economize in the use of air, while on a heavy grade he will be able to apply the pressure just as in his judgment may be best and sufficient and no more.

The object of the invention is, further, to simplify the general construction of air-brakes upon railway-cars.

In my improved brake the brake-piston is moved in one direction to take off the brakes by air admitted through a pipe running from the engine and a source of air-supply under pressure on the same, and is thrown in the other direction to apply the brakes by air admitted through an electro-magnetically-controlled valve controlling the admission of air to the cylinder at the opposite side of the piston. The electro-magnet for said valve is governed by a circuit controller or key, which is operated automatically by a pressure-gage, said pressure-gage being located on the engine within control of the engineer, and being provided with devices whereby its action may be regulated so that the electro-magnet shall be operated when a certain or determinate pressure is reached.

The invention consists in the combinations of apparatus, and in the improved devices that will be described in connection with the accompanying drawings, and then more specifically stated in the claims.

Referring to the drawings, Figure 1 illustrates in vertical section an apparatus embodying my invention. Fig. 2 illustrates a modification in the construction of the electro-magnetically controlled valve.

G indicates a suitable source of air or other fluid or gas under pressure, which source is located preferably upon the engine, and communicates through a pipe, L, with the brake-cylinders upon the various cars of the train.

K indicates a brake-cylinder upon a car, and A the piston in said cylinder, which piston is provided with a rod, through which, by suitable mechanism, a movement may be communicated to the brake mechanism for applying or taking off the brakes.

Placed in conduit or pipe L, leading from the air-supply and located upon the engine, are two stop-cocks, H H², between which and leading from the pipe L is an opening or pipe, X, communicating with a pressure-gage, to be presently described. The stop-cock H serves to open or close communication between the reservoir G and pipe L, while stop-cock H² in a similar manner controls the passage of air from the reservoir through the pipe L, but is also so constructed that when turned into a certain position it will open a passage from the pipe L through a vent L², thus permitting of the escape of air from the pipe L, and from the chamber communicating with the opening or pipe X, leading to the pressure-gage.

The form of pressure-gage is immaterial; but I have, for the sake of convenience, herein shown a form in which a cylinder and piston are employed, the movement of the piston being opposed by a suitable spring.

F indicates the cylinder, and E the piston, the piston-rod E² of which moves through a pipe or tube, C, that is screw-threaded, as shown, and is tapped into the cylinder-head. A spring, D, surrounding the piston-rod and compressed between the piston E and the end of the tube C, opposes the movement of the piston under the pressure of air admitted through the pipe X. A handle, B, secured to the tube C, permits the latter to be adjusted in or out to determine the pressure of the spring D, and the consequent amount of pressure of air that must exist in order that a movement of the rod and piston sufficient to operate a circuit-controller or switch may be obtained.

An electric switch of any desired construction is employed with the pressure-gage and controls a circuit leading to an electro magnet or magnets combined with the brake-cylinders, as will be presently set forth. A suitable switch for the purpose is indicated at J, and consists simply of a lever which rests against the end of the piston-rod $E^2$, and also carries the contact $W^2$, that will be thrown into contact with a stop, W, when the piston E is raised to a certain point against the action of spring D.

I indicates a galvanic battery or other source of electricity, whose circuit is through the contacts W $W^2$ and lever J, and thence through wires 3 3 to binding-posts $i$ $i$, placed on the side of cylinder K, or otherwise located, and connected through the walls of said cylinder with the coils of an electro-magnet, N. The latter magnet controls a valve through which air is admitted to the rear side of the piston A. A convenient construction of electro-magnet and valve devised by me consists of the following parts:

M indicates the hollow core of an electro-magnet, which core is screw-threaded at its end, and is tapped into the end of cylinder K, as shown. Through this core the air is admitted at proper times to a cylinder, K, from an air-space communicating with a pipe or passage, T, and from which space air may pass through a valve, P V, to the hollow core. An opening, O, in the side of cylinder K admits air from the space in front of the piston to the passage T, and from thence the air passes through valve-opening V, when the valve is open, and to the rear side of the piston. The valve P is operated by means of a rod, S, carrying the valve, and also provided with an armature, Q, that is placed within the magnetic influence of the core M. A suitable spring, R, tends to hold the valve P closed.

$O^2$ indicates a cap or tube of brass secured to the end of the magnet-core, and having the valve-opening V formed in its end, as indicated. Over the valve and magnet is placed a protecting cap or cover, U, of brass or other suitable material, thus forming a chamber with which the passage T communicates, and from which air passes through valve P V.

A simplified construction is illustrated in Fig. 2. In this instance a tube, $S^2$, screws into one end of the brake-cylinder, and within it is secured the electro-magnet by any suitable means. Connected with the outer end of said tube by a coupling of any kind is the tube or passage T, which in this instance is made independent of the brake-cylinder, instead of being formed in one with it. In other respects the construction of the apparatus would be substantially the same as that of the arrangement shown in Fig. 1.

When there is no pressure of air in the pipe X and pressure-gage, the switch J is open and the valve P closed, the valve being operated by the spring R. When desired, the cocks H $H^2$ being turned to admit air from the reservoir G to the pipe L, air passes through said pipe into cylinder K, and forces the piston A backward into the cylinder, thus releasing the brakes. When the piston A passes the opening O, air then flows through pipe or passage T into the chamber or space at the outside of valve-opening V, but cannot pass through the same to the rear side of the piston, owing to the fact that the valve is closed by the action of the spring R. When the pressure in pipe X reaches the point where it forces the piston E up sufficiently to close the circuit of the battery I, the electro-magnet N is energized, and pulling on its armature Q draws down the valve P and admits air to the rear portion of the cylinder K. Under this condition, there being a communication from the pipe L with both sides of the piston, there will be of course the same pressure on both sides of the same, and said piston will remain at rest.

Should the pipe or passage L be ruptured by any means—as, for instance, by disconnection of the cars of the train—the pressure on the pressure-gage will cease and the circuit of electro-magnet N will be opened, so that the spring R will immediately close the valve P. At the same time the air will escape from the space at the front of the piston, and the compressed air which has been admitted through the hollow core of magnet N will force the piston A forward and apply the brakes. The same action may obviously be produced by the engineer when he desires to stop a train. In this case he simply turns the cocks H and $H^2$ in such direction as to cut off the supply from the chamber G and permit the escape of air from the pipe L and passage X, thus taking off the pressure from the pressure-gage and from the front side of the piston A, and simultaneously causing the valve P to close and confine air under pressure at the rear of the piston A.

It will be noticed that in the cylinder K there are not stops of any kind to determine the position that the piston A shall take at any time. Its position is determined entirely by the adjustment of the pressure-gage, or by making and breaking the electric circuit as often as may be required.

In practice by setting the wheel B and screw-pipe C so as to govern or determine the action of spring D the engineer can determine just what amount of pressure he will throw into the cylinder, and in applying the brakes he can weaken the effects on piston A by opening and closing the circuit through the action of a circuit-breaker—such as indicated at J—or by any other device whereby the operation of the electro-magnet may be connected independently of the operation of the circuit-controller worked by the pressure-gage.

It will be noticed that in my improved brake no auxiliary cylinder is employed, but that the brakes are applied by the pressure of air contained in the brake-cylinder at the rear side of the piston, the air being confined for such purposes at the proper time by the operation of an electro-magnetically-controlled valve, governed either by a circuit-breaker working by hand and placed on the engine or at any other suitable point, or by the operation of a circuit-controller worked automatically by the pressure-gage connected with the pipe L, and placed preferably on the engine, or at any other point, so that decrease of pressure at the front of the piston will produce an operation of the circuit-controller, and will cause the valve governing the passage of air to or from the rear side of the piston to automatically close.

I do not limit myself to any particular construction or form of electro-magnet, nor to any particular arrangement of circuit-controllers, as it is obvious that the same effects might be obtained by devices of very different construction, provided they were properly arranged and applied to control the air-passages in the manner herein set forth.

What I claim as my invention is—

1. The combination, with an air-brake cylinder the piston of which is connected with the brake mechanism, of a pipe through which air is admitted to one side of the piston to hold the brakes off, and an electro-magnetically-controlled valve for admitting air to the other side of said piston, so as to furnish pressure for applying the brakes.

2. The combination, with the air-brake cylinder, of a supply-pipe leading from a source of air under pressure and opening into the cylinder on one side of the piston, an electro-magnetically-controlled valve governing the passage of air from said pipe to the opposite side of the piston, and means for controlling the pressure in the supply-pipe.

3. The combination, with an air-brake cylinder, of a valve controlling the passage of air to or from the rear side of the piston, an electro-magnet for operating said valve, and a pressure-gage operating a circuit-controller or switch connected with the circuit of said electro-magnet.

4. The combination, with an air-brake cylinder, of a pipe leading from a suitable source of air-pressure and communicating with the cylinder at the front of the piston, a valve controlling the communication between said pipe and the rear of the piston, an electro-magnet for operating said valve, a circuit connecting the electro-magnet with a circuit-controller, and a pressure-gage connected also with said pipe and operating upon the circuit-controller, as and for the purpose described.

5. The combination, with an air-brake cylinder, of an electro-magnet and valve governing a passage communicating with one side of the piston, a pressure-gage having means of adjustment placed within the control of the engineer, and an electric switch or circuit-controller operated by said pressure-gage and governing the action of said electro-magnet.

6. The combination, substantially as described, with an air-brake apparatus, of an electro-magnetically-controlled valve and an automatic pressure-gage and circuit-controller governing the operation of said electro-magnet.

7. The combination, with the piston-cylinder, of connections from an air-supply to both ends of the cylinder, a valve controlling the flow of air to the end of the cylinder and side of the piston proper for applying the brake, and means for closing said valve when the brakes are to be applied, so as to cause the brakes to be put on by the pressure of air stored in one end of the brake-cylinder.

8. The combination, with the hollow magnet-core of iron forming a portion of the air-passage, of a valve controlling said passage, an armature for said electro-magnet connected with the valve for operating the same, and a spiral spring supported within the hollow magnet-core and serving as the retractor for the armature, as and for the purpose described.

9. The combination, with the hollow magnet-core of iron forming a portion of the air-passage to the brake-cylinder, of a rod working longitudinally and parallel to the magnetic axis, and a valve and armature carried by said rod.

Signed at Baltimore, and State of Maryland, this 19th day of March, A. D. 1886.

CHARLES SELDEN.

Witnesses:
J. B. STEWART,
MURRAY HANSON.